UNITED STATES PATENT OFFICE.

RASIKLAL DATTA, OF CALCUTTA, INDIA.

PROCESS OF PRODUCING CHLORIN.

1,310,943.  Specification of Letters Patent.  Patented July 22, 1919.

No Drawing.   Application filed August 17, 1916.   Serial No. 115,554.

*To all whom it may concern:*

Be it known that I, RASIKLAL DATTA, a subject of the King of Great Britain, residing at Calcutta, India, have invented certain new and useful Improvements in Processes of Producing Chlorin, of which the following is a specification.

My invention relates to a process of producing chlorin gas, by the oxidization, preferably in a gaseous state, of nitrosyl chlorid; and to the further obtaining of chlorin gas by the oxidization of hydrochloric acid, preferably in a gaseous state, such hydrochloric acid being produced by chemical reactions upon certain of the by-products formed in obtaining the nitrosyl chlorid.

Prior to my invention, as far as I am aware, the oxidization of nitrosyl chlorid, by means of air, or the oxidization of hydrochloric acid by means of nitrous gases, was not known or practised.

In producing nitrosyl chlorid, from which chlorin gas is obtained, I place sodium chlorid in an earthen ware retort, to which is gradually added nitrosyl sulfuric acid, or sulfuric acid in which nitrous gases have been absorbed, in the presence of heat. A sufficient amount of the acid is added to effect a complete reaction between it and the sodium chlorid. Nitrosyl chlorid is evolved, in accordance with the following equation:

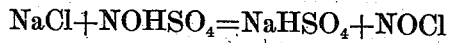

The nitrosyl chlorid thus obtained is separated out, and in a gaseous form, is passed together with a current of air, through a heated tube containing pumice stone. During this passage the nitrosyl chlorid becomes quantitatively oxidized, with the formation of nitrous gases ($N_2O_3$ and $N_2O_4$), and chlorin gas. This reaction is represented in the following equations:

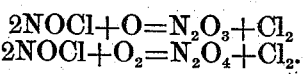

The mixture of chlorin gas (Cl) and nitrous gases ($N_2O_3$ and $N_2O_4$), is passed through bottles or towers connected in series and containing ordinary strong sulfuric acid. The nitrous gases are dissolved in the sulfuric acid, forming nitrosyl sulfuric acid ($NOHSO_4$), while the chlorin gas issues from the apparatus together with air deficient in oxygen. The discharging chlorin gas may be further purified or washed as by being passed through chambers or receptacles containing slaked lime, for the manufacture of bleaching powder, or for any other desired purpose.

The above description states the process of obtaining chlorin gas from nitrosyl chlorid, by its oxidization with air, and the following description sets forth the production of chlorin gas by the oxidization of hydrochloric acid by means of nitrous gases, such hydrochloric acid being obtained by chemical reactions upon the by-product resulting from the production of the nitrosyl chlorid, herein above described.

The nitrous gases above referred to, which are passed with the chlorin gas through the sulfuric acid, are absorbed by such sulfuric acid in the wash towers. There are a plurality of these towers connected in series, and it is obvious that the sulfuric acid in the first tower will become saturated with the nitrous gases prior to the saturation of the acid in the other towers. This first tower is then removed and the gases discharged into the next tower while a tower containing fresh sulfuric acid is connected to the last tower, the towers being thus advanced in the series. In this way, fresh quantities of sulfuric acid are brought up and the quantities of sulfuric acid saturated with nitrous gases, whereby nitrosyl sulfuric acid $NOHSO_4$ is formed, are taken out. This is a source of the nitrosyl sulfuric acid, which is added to sodium chlorid, for obtaining the nitrosyl chlorid NOCl, which is oxidized as herein above indicated. In the equation indicating the production of the nitrosyl chlorid, it is apparent that acid sodium sulfate is left behind in the retort, and for the purpose of convenience the formula is repeated, to wit,

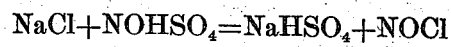

To utilize this acid sodium sulfate for the production of hydrochloric acid, to be oxidized by the nitrous gases, such acid sodium sulfate is placed in the porcelain retort with the equivalent quantity by weight of sodium chlorid, (NaCl) and suitably heated. As a result of this chemical reaction, normal sodium sulfate and hydrochloric acid are produced, as indicated in the following equation:

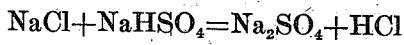

The hydrochloric acid thus obtained is oxidized by passing it along with nitrous gases ($N_2O_3$) mixed with air, through a heated tube, containing pumice stone. The hydrochloric acid is oxidized with the formation of nitric oxid and chlorin gas according to the following equation:

$$2HCl + N_2O_3 = H_2O + Cl_2 + 2NO.$$

The nitric oxid represented in this equation (2NO), is oxidized by the oxygen in the air to form nitrous gases in accordance with the following equations:

$$2NO + O = N_2O_3$$
$$2NO + O_2 = N_2O_4$$

These nitrous gases may act upon fresh quantities of hydrochloric acids for oxidizing the same and freeing chlorin as above explained. In fact, a small quantity of nitric oxid may be used for the oxidization of a large quantity of hydrochloric acid, in the presence of air. The gas escaping from the tube of the apparatus will be found to comprise chlorin, nitrous gases and air, deficient in oxygen. This gas is passed through the towers containing the strong sulfuric acid, for the recovery of the chlorin gas while the nitrous gases dissolve in the sulfuric acid, forming nitrosyl sulfuric acid, as herein above explained.

With regard to the source of nitrous gases, for the oxidization of the hydrochloric acid, as above explained, I may use either fresh nitrous gases, or the nitrous gases liberated from nitrosyl sulfuric acid, formed as above indicated. But the latter process is generally uneconomical, since nitrosyl chlorid is more easily oxidized by air, and quite quantitatively oxidized, on passing through a heated tube.

The hydrochloric acid liberated by the action of sodium chlorid and sulfuric acid may be oxidized in a similar way, but it is found satisfactory to oxidize the hydrochloric acid only which is formed from acid sodium sulfate and sodium chlorid, since the acid sodium sulfate is obtained as a by-product of the decomposition of nitrosyl sulfuric acid and sodium chlorid.

In the above oxidizing processes, the escaping gases after being freed from nitrous gases by means of the sulfuric acid bath, are passed through the tower or towers containing water, for absorbing any small quantities of hydrochloric acid which may pass over undecomposed. This also serves to further purify or wash the chlorin gas.

The discharging gas from the water tower or towers, contain chlorin mixed with air which is deficient in oxygen. The escaping air richer in nitrogen, after passing through a chamber containing slaked lime, may be freed from the remaining traces of oxygen, by any ordinary known method, and the resulting nitrogen fixed according to any known method.

Having thus described the invention, I claim:—

1. The herein described process of producing chlorin gas, which consists in passing nitrosyl chlorid and air through a heated tube containing an inert filler whereby nitrous gases and chlorin gas are produced, passing the gaseous mixture thus produced through sulfuric acid whereby the nitrous gases react with the sulfuric acid to form nitrosyl sulfuric acid and the chlorin gas escapes from the presence of the sulfuric acid.

2. The herein described process of producing chlorin gas, which consists in (1) subjecting sodium chlorid to the action of nitrosyl sulfuric acid for producing nitrosyl chlorid and acid sodium sulfate, (2) separating out the nitrosyl chlorid, (3) oxidizing the nitrosyl chlorid for producing nitrous gases and chlorin gas, (4) passing the gaseous mixture produced in step (3) through sulfuric acid whereby the nitrous gases react therewith to form nitrosyl sulfuric acid used in step (1) and the chlorin gas escapes from the presence of the sulfuric acid.

3. The herein described process of producing chlorin gas, which consists in (1) subjecting an alkali metal chlorid to the action of nitrosyl sulfuric acid for producing nitrosyl chlorid and an acid alkali metal sulfate, (2) separating out the nitrosyl chlorid, (3) subjecting the nitrosyl chlorid to the action of air in the presence of heat whereby nitrous gases, $N_2O_3$ and $N_2O_4$ and chlorin gases are produced, (4) passing the gaseous mixture of step (3) through sulfuric acid whereby the nitrous gases react therewith to form nitrosyl sulfuric acid used in step (1) and the chlorin gas escapes from the presence of the sulfuric acid.

In testimony whereof I affix my signature in the presence of two witnesses.

RASIKLAL DATTA.

Witnesses:
 AUSHOOTOSH LUOOKERJER,
 R. J. FITNESS.